(12) United States Patent
Bian (10) Patent No.: US 12,487,401 B2
(45) Date of Patent: Dec. 2, 2025

(54) PHOTONIC INTEGRATED CIRCUIT INCLUDING OPTICAL ABSORBER FOR TERMINAL END OF WAVEGUIDE

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 284 days.

(21) Appl. No.: 18/320,967

(22) Filed: May 20, 2023

(65) Prior Publication Data

US 2024/0385373 A1 Nov. 21, 2024

(51) Int. Cl.
  G02B 6/12 (2006.01)
  G02B 6/122 (2006.01)
  G02B 6/13 (2006.01)

(52) U.S. Cl.
  CPC .......... G02B 6/1228 (2013.01); G02B 6/13 (2013.01); *G02B 2006/12126* (2013.01)

(58) Field of Classification Search
  CPC ........................................ G02B 2006/12126
  See application file for complete search history.

(56) References Cited

U.S. PATENT DOCUMENTS

| | | |
|---|---|---|
| 2,557,110 A | 6/1951 | Jaynes |
| 2,619,538 A | 11/1952 | Grant |
| 6,002,514 A * | 12/1999 | Barrett .................. G02B 6/243 385/140 |
| 7,116,880 B1 | 10/2006 | Liu et al. |
| 8,089,285 B2 | 1/2012 | Hsu et al. |
| 8,664,047 B2 | 3/2014 | Lower et al. |
| 9,075,251 B2 | 7/2015 | Dwivedi et al. |
| 11,163,114 B2 | 11/2021 | Bian et al. |
| 2011/0064355 A1* | 3/2011 | Soma ................. G02B 6/12019 385/38 |
| 2012/0251041 A1* | 10/2012 | Ishikawa ................. G02B 6/30 385/24 |
| 2013/0113968 A1 | 5/2013 | Lenchenkov et al. |
| 2017/0146735 A1* | 5/2017 | Evans .................. G02B 6/2813 |
| 2017/0322373 A1 | 11/2017 | Shi et al. |
| 2017/0345952 A1* | 11/2017 | Yashiki ................ H10F 77/413 |
| 2021/0265513 A1 | 8/2021 | Bian et al. |

(Continued)

OTHER PUBLICATIONS

Extended European Search Report for corresponding European patent application No. 23209360.9 dated Apr. 12, 2024, 8 pages.

(Continued)

*Primary Examiner* — Charlie Y Peng
(74) *Attorney, Agent, or Firm* — Francois Pagette; Hoffman Warnick LLC (57) ABSTRACT

A photonic integrated circuit (PIC) includes a waveguide in or over a semiconductor substrate. The waveguide has a terminal end. The PIC also includes an optical absorber having a curved shape adjacent to opposing sides and an endwall of the terminal end of the waveguide, i.e., it surrounds the terminal end of the waveguide. The optical absorber is multi-layered and includes a light absorbing layer. The light absorbing layer may include germanium or a vanadate. The optical absorber terminates or attenuates any stray optical signals from the waveguide while maintaining low back reflection.

20 Claims, 12 Drawing Sheets

(56) References Cited

U.S. PATENT DOCUMENTS

| | | | |
|---|---|---|---|
| 2021/0396929 A1 | 12/2021 | Bian et al. | |
| 2022/0091331 A1* | 3/2022 | Bian | G02B 6/124 |
| 2022/0350079 A1 | 11/2022 | Aboketaf et al. | |
| 2024/0094465 A1* | 3/2024 | Bian | G02B 6/125 |

OTHER PUBLICATIONS

Aboketaf et al., "Towards fully automated testing and characterization for photonic compact modeling on 300-mm wafer platform," W6A.1, OFC 2021, OSA 2021, 3 pages.

Bian et al., "3D Integrated Laser Attach Technology on 300-mm Monolithic Silicon Photonics Platform," 978-1-7281-5891-4/20, IEEE 2020, 2 pages.

Bian et al., "Towards low-loss monolithic silicon and nitride photonic building blocks in state-of-the-art 300mm CMOS foundry," FW5D.2, Frontiers in Optics, Laser Science, OSA 2020, 2 pages.

Bian et al., "Monolithically integrated silicon nitride platform," Th1A.46, OFC 2021, OSA 2021, 3 pages.

Bian et al., "Hybrid III-V laser integration on a monolithic silicon photonic platform," M5A.2, OFC 2021, OSA 2021, 3 pages.

Bian et al., "Light manipulation in a monolithic silicon photonics platform leveraging 3D coupling and decoupling," Frontiers in Optics, Laser Science, FTu6E.3.pdf, OSA 2020, 3 pages.

Bian et al., "3D silicon photonic interconnects and integrated circuits based on phase matching," 2021 IEEE 71st Electronic Components and Technology Conference (ECTC), 2279-84, 6 pages.

Bian et al., "3D Integrated Laser Attach Technology on 300-mm Monolithic CMOS Silicon Photonics Platform," IEEE Journal of Selected Topics in Quantum Electronics, 29:8200519, May/Jun. 2023, 19 pages.

Chowdhury et al., "High Performance Avalanche Photodiode in a Monolithic Silicon Photonics Technology," W3D.1, OFC 2022, Optica Publishing Group 2022, 3 pages.

Giewont et al., "300-mm Monolithic Silicon Photonics Foundry Technology," IEEE Journal of Selected Topics in Quantum Electronics, 25:8200611, Sep./Oct. 2019, 12 pages.

Lockwood et al., "Optical Properties of Germanium Dots Self-Assembled on Porous TiO2 Templates," ECS Transactions, 33:147-165, 2011, 20 pages.

Peng et al., "A CMOS Compatible Monolithic Fiber Attach Solution with Reliable Performance and Self-Alignment," Th31.4, OFC 2020, OSA 2020, 3 pages.

Rakowski et al., "45nm CMOS—Silicon Photonics Monolithic Technology (45CLO) for next-generation, low power and high speed optical interconnects," T3H.3, OFC 2020, OSA 2020, 3 pages.

Shen et al., "Increasing the density of passive photonic-integrated circuits via nanophotonic cloaking," Nature Communications, 7:13126, Nov. 2016, 9 pages.

Yakimov et al., "Electromodulated reflectance study of self-assembled Ge/Si quantum dots." Nanoscale Research etters, 6:208, 2011, 5 pages.

Zhang et al., "Thin Germanium Waveguide-Array-Like Absorber Based on Localized Responance," IEEE Photonics Journal, 14:4644605, Aug. 2022, 5 pages.

U.S. Appl. No. 17/525,293, filed Nov. 12, 2021, entitled Photonic Chip Security Structure, 24 pages.

U.S. Appl. No. 17/525,327, filed Nov. 12, 2021, entitled Bragg Reflector for Photonic Chip Security Structure, 37 pages.

U.S. Appl. No. 17/807,275, filed Jun. 16, 2022, entitled Photonic Integrated Circuit Including Passive Optical Guard, 36 pages.

U.S. Appl. No. 18/084,921, filed Dec. 20, 2022, entitled Photodetectors with a Tapered Interface, 29 pages.

* cited by examiner

PHOTONIC INTEGRATED CIRCUIT INCLUDING OPTICAL ABSORBER FOR TERMINAL END OF WAVEGUIDE

BACKGROUND

The present disclosure relates to semiconductor structures and, more particularly, to a photonic integrated circuit structure including an optical absorber for a terminal end of a waveguide and methods of manufacture.

Photonic integrated circuits (PICs) can be made using existing semiconductor fabrication techniques, and because silicon is already used as the substrate for most integrated circuits, it is possible to create hybrid devices in which the optical and electronic components are integrated onto a single microchip. PICs include a variety of photonic components that receive and/or output optical signals. Certain optical components in a PIC, such as optical waveguides, optical input/output couplers, laser couplers, among others, can create stray optical signals. The stray optical signals are scattered through the PIC and create background optical noise. The stray optical signals received by an unintended photonic component, e.g., a photodetector, may create operational problems for that component. Spiral optical absorbers are used to capture stray optical signals, but they have a very large footprint, and may scatter the optical signal into neighboring structure.

SUMMARY

All aspects, examples and features mentioned below can be combined in any technically possible way.

An aspect of the disclosure provides a photonic integrated circuit (PIC), comprising: a waveguide in or over a semiconductor substrate, the waveguide having a terminal end; and an optical absorber having a curved shape adjacent to opposing sides and an endwall of the terminal end of the waveguide, the optical absorber is multi-layered and includes a light absorbing layer.

An aspect of the disclosure provides a photonic integrated circuit (PIC), comprising: a waveguide in or over a semiconductor substrate, the waveguide including a first portion of one of silicon and silicon nitride and a second portion of a light absorbing layer positioned at least over the first portion or under the first portion, and wherein the waveguide is linear and has a terminal end; and an optical absorber having a curved shape surrounding the terminal end of the waveguide, the optical absorber includes a light absorbing layer over a silicon layer, wherein the light absorbing layer includes one of germanium and a vanadate.

An aspect of the disclosure provides a method of forming a photonic integrated circuit (PIC), the method comprising: forming a waveguide in or over a semiconductor substrate, the waveguide having a terminal end; and forming an optical absorber having a curved shape surrounding the terminal end of the waveguide, the optical absorber includes a light absorbing layer over a silicon layer, wherein the light absorbing layer includes one of germanium and a vanadate.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure include a photonic integrated circuit (PIC). The PIC includes a waveguide in or over a semiconductor substrate. The waveguide has a terminal end. The PIC also includes an optical absorber having a curved shape adjacent to opposing sides and an endwall of the terminal end of the waveguide, i.e., it surrounds the terminal end of the waveguide. The optical absorber includes a light absorbing layer over a silicon layer. The light absorbing layer includes germanium or a vanadate. The optical absorber terminates or attenuates stray optical signals from the waveguide while maintaining low back reflection.

Figure 1:
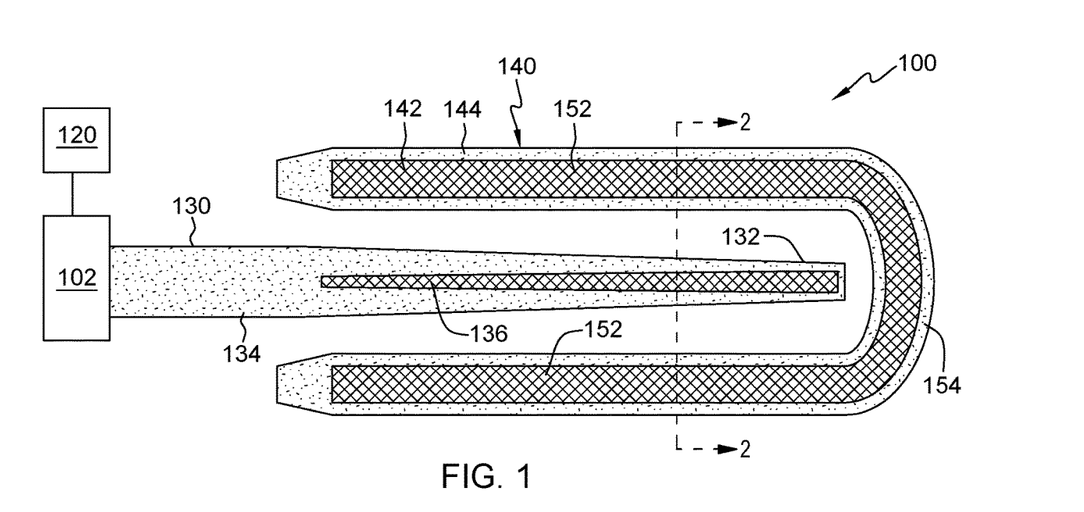
FIG. 1 shows a top-down view of a photonic integrated circuit (PIC) including an optical absorber, according to embodiments of the disclosure.
Figure 2:
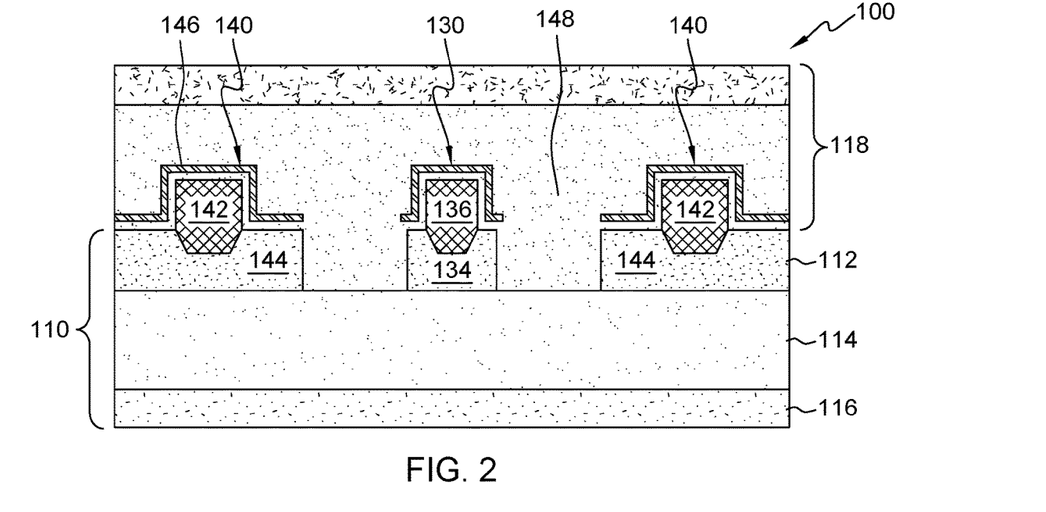
FIG. 2 shows a cross-sectional view of the PIC including the optical absorber along view line 2-2 in FIG. 1, according to embodiments of the disclosure.

FIG. 1 shows a schematic top-down view of a PIC 100, and FIG. 2 shows a cross-sectional view of PIC 100 along view line 2-2 in FIG. 1. (Note, FIG. 1 shows layers 134, 136, 142, 144 without the illustrated cap layer in FIG. 2). PIC 100 includes a photonic component 102 (FIGS. 1 and 3 only for clarity purposes) on or in a semiconductor substrate 110. Semiconductor substrate 110 may include any now known or later developed semiconductor substrate. In the non-limiting example shown, semiconductor substrate 110 includes a layered semiconductor-insulator-semiconductor substrate in place of a more conventional silicon substrate (bulk substrate). As shown in FIG. 2, semiconductor substrate 110 includes a semiconductor-on-insulator (SOI) substrate including a semiconductor layer 112 (e.g., an active semiconductor layer) over a buried insulator layer 114 over a base semiconductor layer 116. Semiconductor layer 112 (hereafter "active SOI layer 112" for brevity) and base semiconductor layer 116 may include but are not limited to: silicon, germanium, silicon germanium, silicon carbide. Buried insulator layer 114 may include any appropriate dielectric such as but not limited to silicon dioxide, i.e., forming a buried oxide (BOX) layer. A portion of or the entire semiconductor substrate may be strained. The precise thickness of buried insulating layer 114 and active SOI layer 112 may vary widely with the intended application.

Photonic component 102 is on or in semiconductor substrate 110. In certain embodiments, photonic component 102 may be positioned in active SOI layer 112. In other embodiments, photonic component 120 may be in any middle-of-line (MOL) or back-end-of-line (BEOL) interconnect layer 118 over semiconductor substrate 110, i.e., dielectric layer with metal wire or vias therein. Photonic component 102 may be any optical component such as but not limited to at least one of: a photodetector, an avalanche photodiode (APD), an optical waveguide, an optical input/output coupler, and an optical absorber. PIC 100 may also include an electronic component 120 (FIGS. 1 and 3 only for clarity purposes), which may be formed, for example, in active SOI layer 112, e.g., at a location other than where photonic component 102 is located. Photonic component 102 may be operatively connected and interact with electric component 120 in any now known or later developed fashion. In embodiments, electronic component 120 may be any passive or active device including, e.g., transistors with contacts and metal wiring layers, etc.

Figure 20:
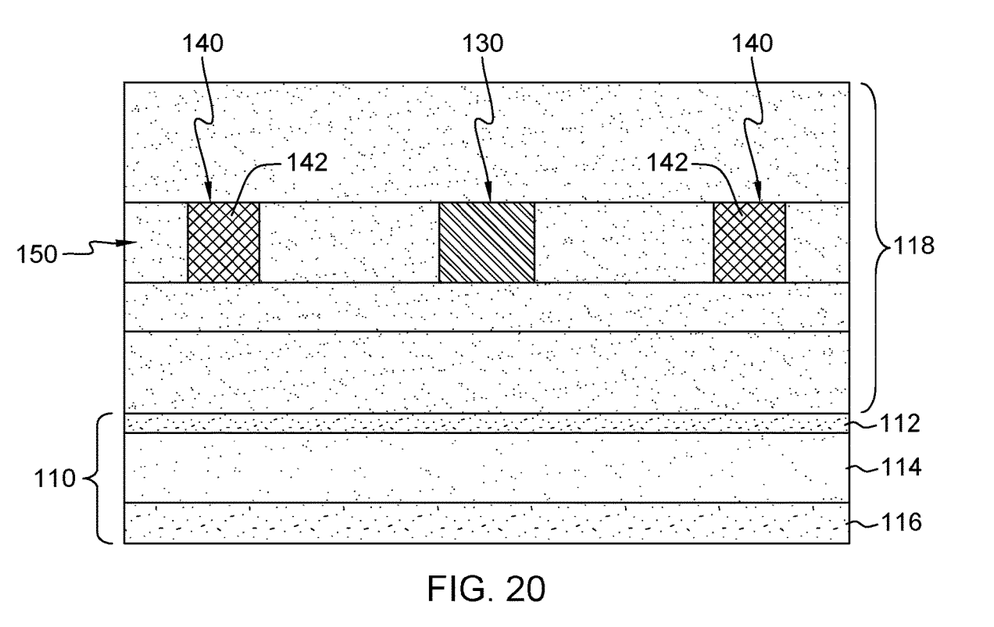
FIG. 20 shows a cross-sectional view of a PIC including an optical absorber, according to other embodiments of the disclosure.

PIC 100 includes an optical waveguide 130 (hereafter "waveguide 130"). Waveguide 130 is optically coupled to photonic component 102 to receive/transmit optical signals to photonic component 102. The optical signals typically, but not necessarily, travel in a plane of semiconductor substrate 110 or parallel to semiconductor substrate 110. Optical signals traveling outside of waveguide 130 are considered undesired or harmful 'stray optical signals' or 'optical noise.' Waveguide 130 is in or over semiconductor substrate 110. As will be described further herein, waveguide 130 can take a variety of material forms according to embodiments of the disclosure. In any event, waveguide 130 includes a terminal end 132. Terminal end 132 is a location at which it is desired to minimize stray optical signals. To this end, PIC 100 includes an optical absorber 140 having a curved shape adjacent to opposing sides and an endwall of terminal end 132 of waveguide 130. That is, optical absorber 140 has a curved shape that surrounds terminal end 132 of waveguide 130. Optical absorber 140 is multi-layered and includes a light absorbing layer 142 over a silicon layer 144. Light absorbing layer 142 may have a light absorbing coefficient that is greater than the light absorbing coefficient of silicon for a given wavelength range. In some embodiments, the light absorbing layer 142 may include germanium or a vanadate. A germanium-including layer 142 of optical absorber 140 may include crystalline germanium (see e.g., FIG. 2), polycrystalline germanium (see e.g., FIG. 20) or amorphous germanium (FIG. 2 or 20). A vanadate-including layer 142 may include a vanadate-based material (i.e., including vanadium and oxygen) such as but not limited to: calcium vanadate ($CaVO_3$) or strontium vanadate ($SrVO_3$). It will be recognized that silicon may also constitute a light absorbing layer.

As shown in FIGS. 1 and 2, where light absorbing layer 142 is in a middle-of-line (MOL) dielectric layer 148 (FIG. 2) of interconnect layers 118, i.e., immediately above active SOI layer 112, it may include crystalline germanium (c-Ge). Otherwise, as will be described further herein, where light absorbing layer 142 is in a back-end-of-line (BEOL) dielectric layer 150 (FIG. 4) of interconnect layers 118, i.e., not immediately above active SOI layer 112, it may include a polycrystalline germanium. Silicon layer 144 may be in active SOI layer 112. In certain embodiments, optical absorber 140 may include a capping layer 146 (labeled in FIG. 2 only for clarity) of, e.g., silicon nitride or other conventional capping materials, thereover.

Optical waveguide 140 is generally linear immediately upstream of terminal end 132 but, as will be described, may have some turns therein in some embodiments. Optical absorber 140 has a curved shaped configured to absorb stray optical signals from terminal end 132 of waveguide 130 to prevent stray optical signals from creating operational problems for any photonic components 102 in PIC 100. As shown in FIG. 1, optical absorber 140 may have a U-shape having a pair of legs 152 extending from a bight portion 154. Terminal end 132 of waveguide 130 is aimed into bight portion 154, such that any stray optical signals coming linearly out of terminal end 132 are directed into bight portion 154. Bight portion 154 can have any curved shape such as a concave shape (facing terminal end 132) that can connect legs 152. In this manner, any stray optical signals coming out of terminal end 132 are absorbed by optical absorber 140. Legs 152 may extend along sides of waveguide 130 to any desired length to absorb stray optical signals escaping from sides of waveguide 130 or otherwise escaping absorption by bight portion 154. In FIG. 1, pair of legs 152 are linear. In other embodiments, as shown for example in FIG. 3, pair of legs 152 may flare outwardly away from waveguide 130 near respective ends of the legs. That is, legs 152 flare outwardly away from waveguide 130 near respective ends of the legs. While bight portion 154 is shown as convex on an outer side (right side as shown), bight portion 154 can have any desired outer shape.

Further embodiments described herein illustrate a wide variety of waveguide 130 and optical absorber 140 options. It is emphasized that while each drawing shows certain aspects of waveguide 130 and optical waveguide 140, the various features of each part can be used together in any combination, including those not expressly illustrated.

Figure 3:
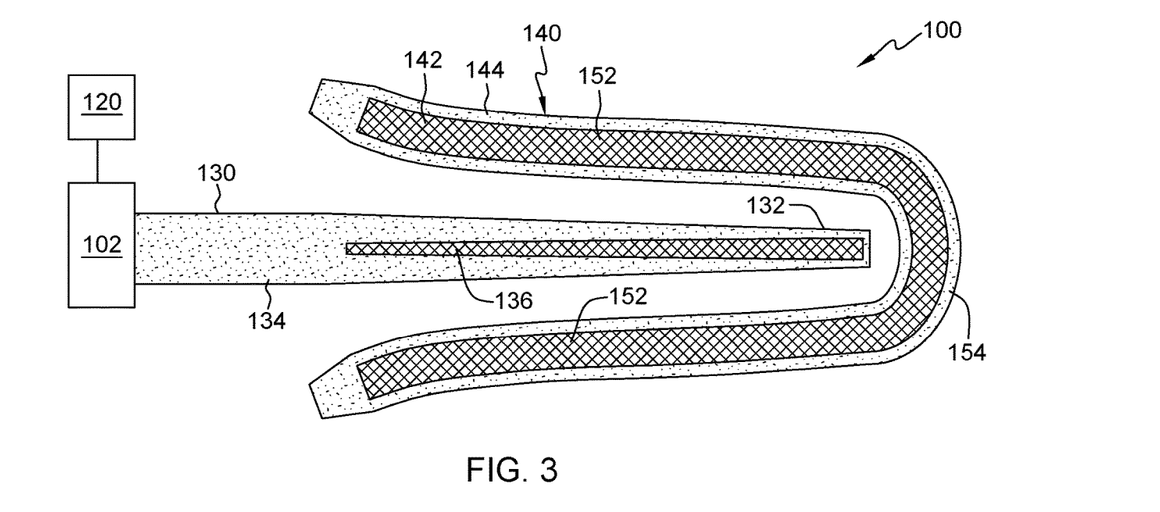
FIG. 3 shows a top-down view of PIC including an optical absorber, according to other embodiments of the disclosure.

Variations of waveguides will now be described. Waveguide 130 can take a variety of material forms. In certain embodiments, as shown in FIGS. 1-3, waveguide 130 includes a first portion 134 of one of silicon and silicon nitride and a second portion 136 of a light absorbing material, e.g., germanium or a vanadate, positioned over first portion 134 and/or under first portion 134. (As used herein, the terms "light absorbing layer" and "light absorbing material" are used to differentiate between the parts of waveguide 130 and optical absorber 140, but they may be structured the same, e.g., as layers, or differently.) In FIGS. 1-2, first portion 134 includes silicon in SOI layer 112 and second portion 136 includes germanium or a vanadate positioned over first portion 134 (and perhaps, but not necessarily, partially in first portion 134).

Figure 4:
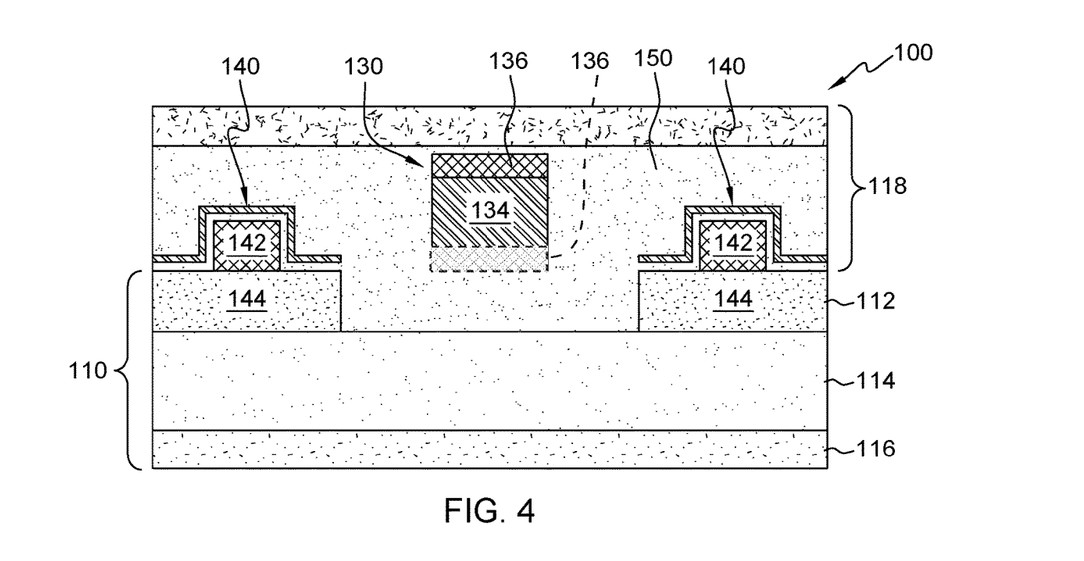
FIG. 4 shows a cross-sectional view of the PIC including the optical absorber, according to other embodiments of the disclosure.
Figure 9:
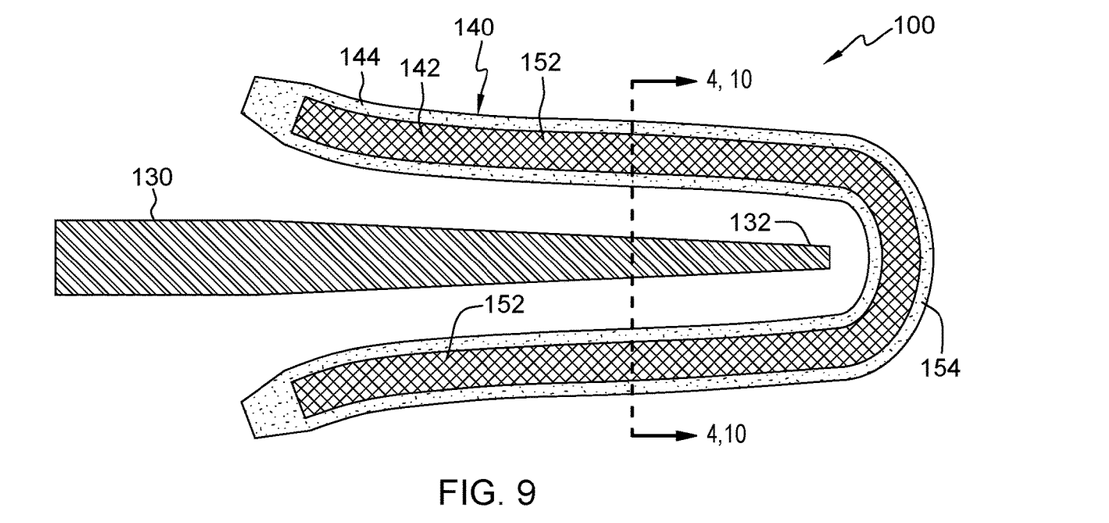
FIG. 9 shows a top-down view of a PIC including an optical absorber, according to embodiments of the disclosure.

FIG. 4 shows a cross-sectional view of PIC 100 (e.g., along view line 4-4 in FIG. 9) including optical absorber 140, according to other embodiments of the disclosure. In FIG. 4, first portion 134 of waveguide 130 includes silicon nitride and second portion 136 of waveguide 130 includes a light absorbing material, e.g., germanium or a vanadate, positioned over first portion 134 and/or under first portion 134 (under shown with dashed box). First portion 134 of silicon nitride (and second portion(s) 136) is located in any MOL or BEOL interconnect layer 118.

Figure 5:
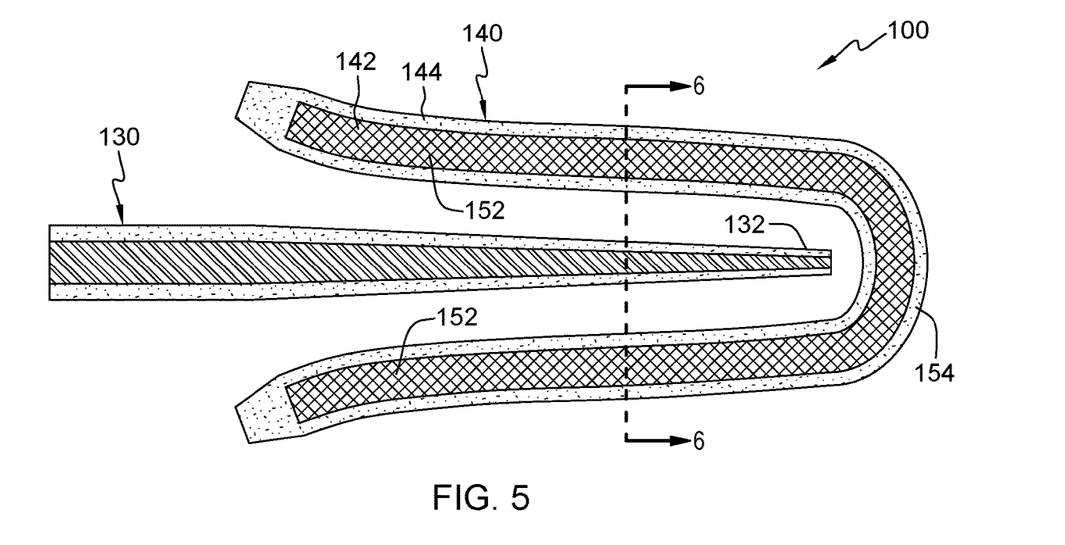
FIG. 5 shows a top-down view of a PIC including an optical absorber, according to embodiments of the disclosure.
Figure 6:
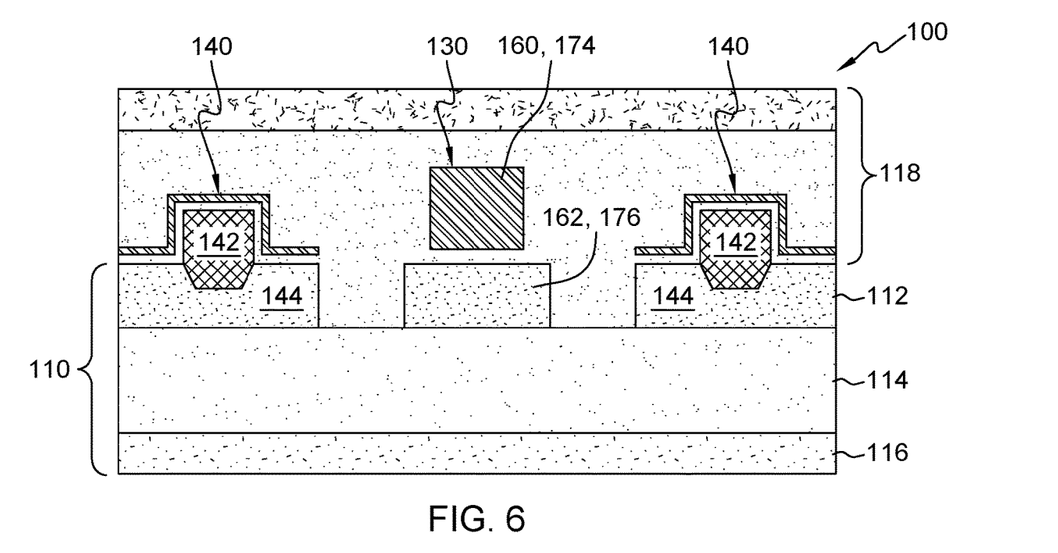
FIG. 6 shows a cross-sectional view of the PIC including the optical absorber along view line 6-6 in FIG. 5, according to embodiments of the disclosure.
Figure 7:
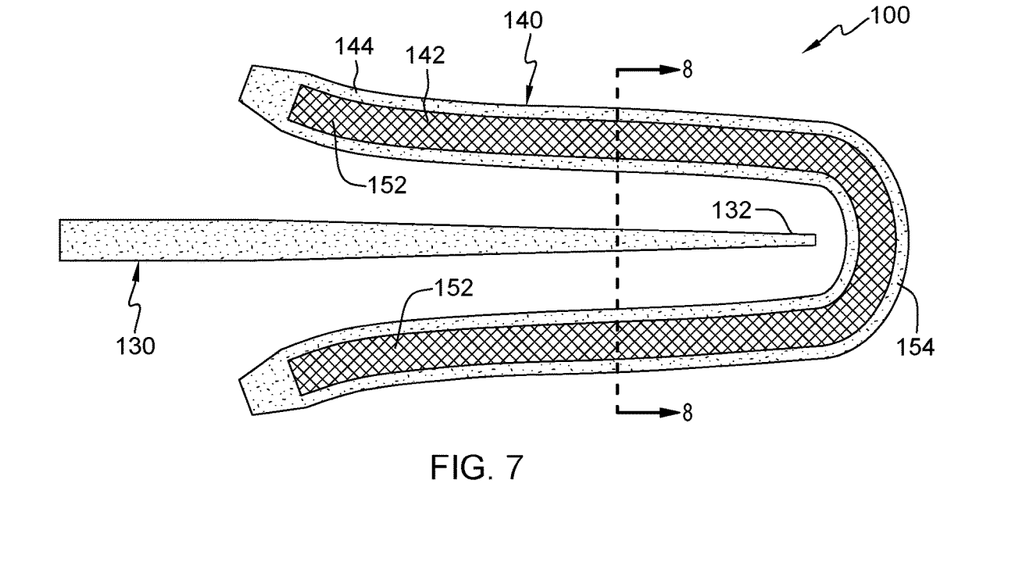
FIG. 7 shows a top-down view of a PIC including an optical absorber, according to embodiments of the disclosure.
Figure 8:
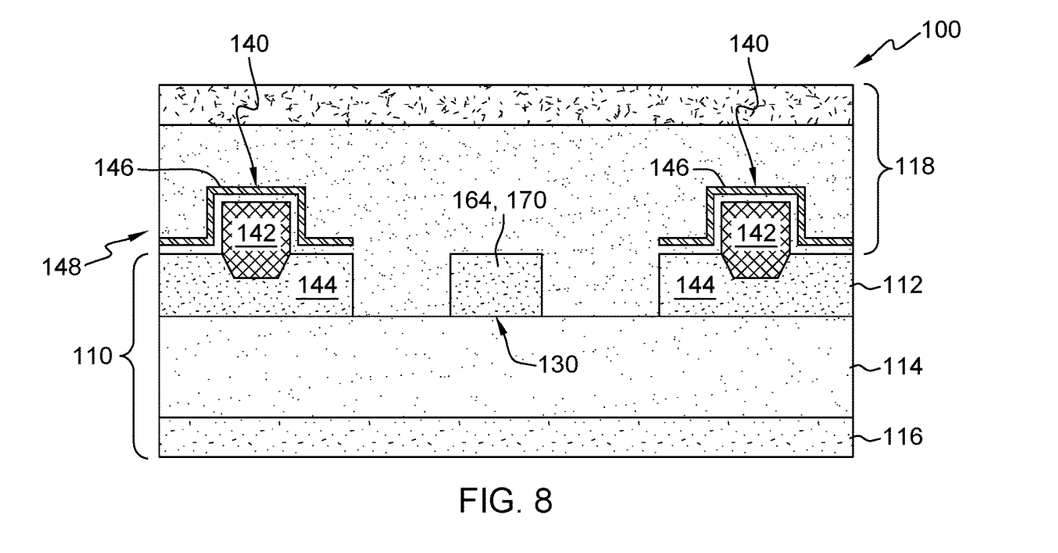
FIG. 8 shows a cross-sectional view of the PIC including the optical absorber along view line 8-8 in FIG. 7, according to embodiments of the disclosure.
Figure 10:
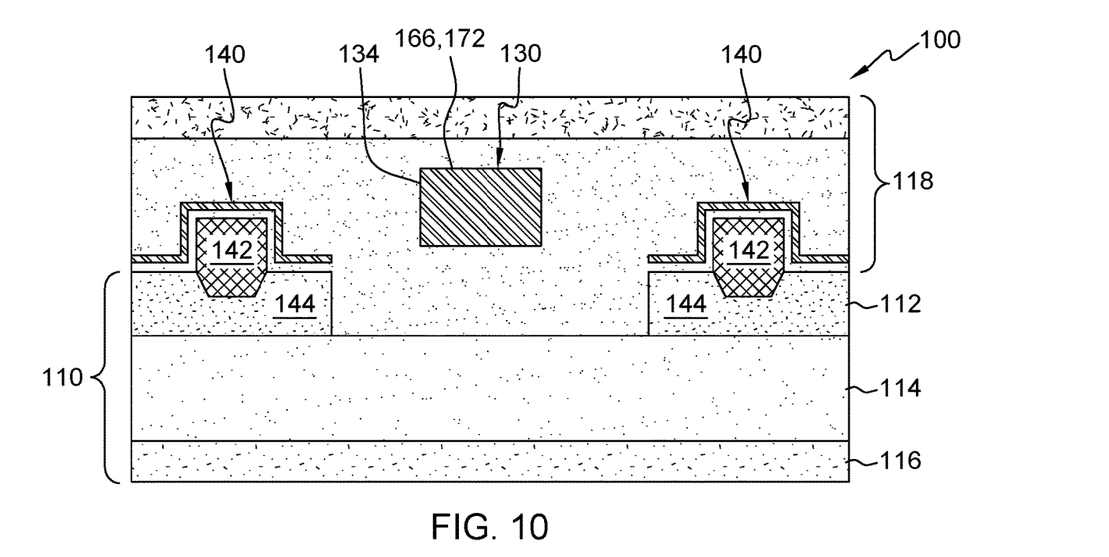
FIG. 10 shows a cross-sectional view of the PIC including the optical absorber along view line 10-10 in FIG. 9, according to embodiments of the disclosure.

In other embodiments, shown in FIGS. 5 and 6, waveguide 130 includes a silicon nitride 160 (e.g., in any MOL or BEOL interconnect layer 118) over silicon 162 in active SOI layer 112. The dielectric of interconnect layers 118 may separate silicon nitride 160 and silicon 162. In other embodiments, shown in FIGS. 7 and 8, waveguide 130 may include silicon 164 in active SOI layer 112. In other embodiments, shown in FIGS. 9 and 10, waveguide 130 may include silicon nitride 166 above active SOI layer 112, i.e., in any MOL or BEOL interconnect layer 118. In other embodiments, as also shown in FIG. 8, waveguide 130 may include amorphous silicon 170 in active SOI layer 112. In other embodiments, as also shown in FIG. 10, waveguide 130 may include polysilicon 172 above active SOI layer 112, e.g., in any MOL or BEOL interconnect layer 118. In other embodiments, as also shown in FIG. 6, waveguide 130 may include polysilicon 174 (e.g., in any MOL or BEOL interconnect layer 118) over silicon 176 in active SOI layer 112.

Waveguide 130 can have a variety of horizontal arrangements. In most embodiments, as shown for example in FIG. 9, waveguide 130 has a tapering width (vertical on page) along at least a portion of a length (horizontal on page) thereof with terminal end 132 having a smallest width. In FIGS. 1-4, first portion 134 (i.e., silicon) of waveguide 130 has a tapering width (vertical on page) along a length (horizontal on page) thereof with terminal end 132 having a smallest width of the silicon, and second portion 136 (i.e., germanium or a vanadate) of waveguide 130 has an enlarging width along a length thereof with terminal end 132 having a largest width of the light absorbing material. Hence, first portion 134 tapers in width as it approaches terminal end 132, and second portion 136 enlarges in width at it approaches terminal end 132. The taper can also be reversed in direction.

Figure 11:
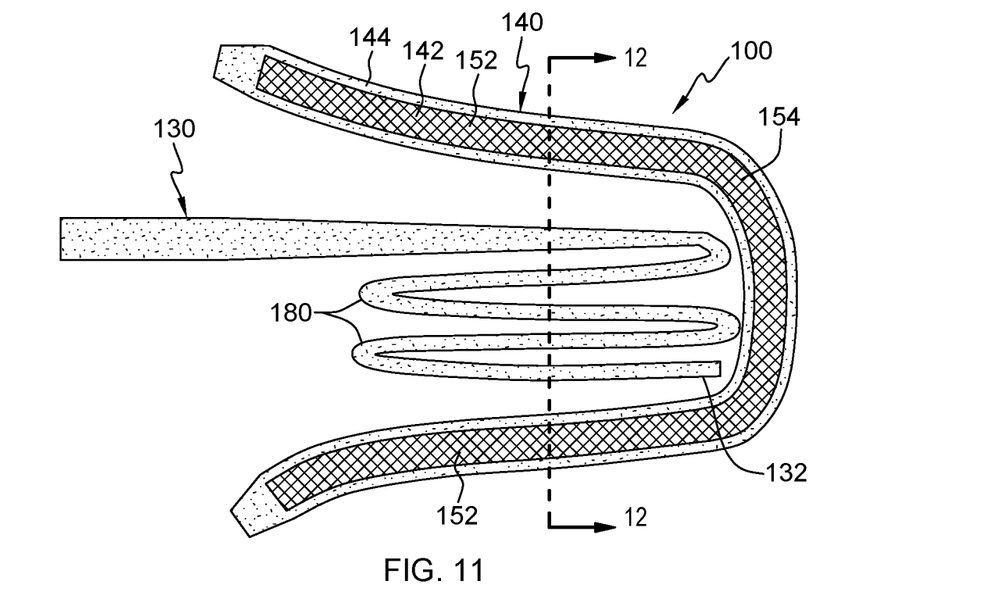
FIG. 11 shows a top-down view of a PIC including an optical absorber, according to embodiments of the disclosure.
Figure 12:
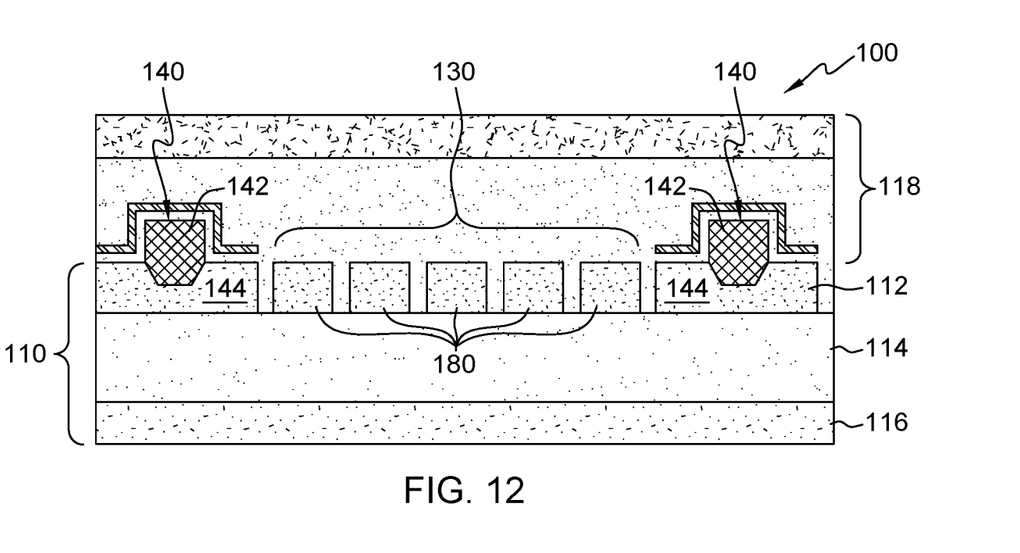
FIG. 12 shows a cross-sectional view of the PIC including the optical absorber along view line 12-12 in FIG. 11, according to embodiments of the disclosure.

As shown in the top-down view of FIG. 11 and cross-sectional view of FIG. 12, waveguide 130 may have a sinusoidal path 180 along a portion of a length thereof. In any event, terminal end 132 is aimed into bight portion 154 of optical absorber 140. While sinusoidal path 180 is shown relative to waveguide 130 with silicon in active SOI layer 112, it may be applied to any waveguide 130 material arrangement described herein.

Figure 13:
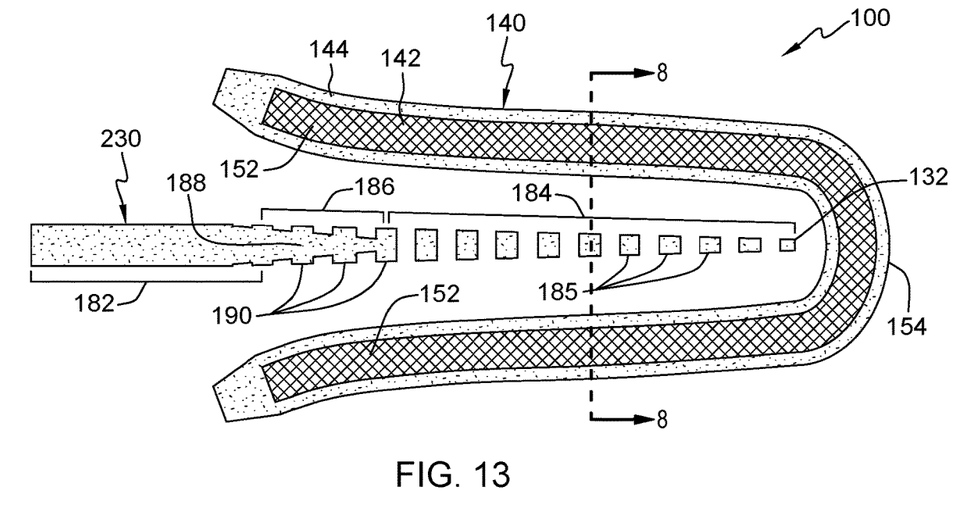
FIG. 13 shows a top-down view of a PIC including an optical absorber, according to other embodiments of the disclosure.
Figure 14:
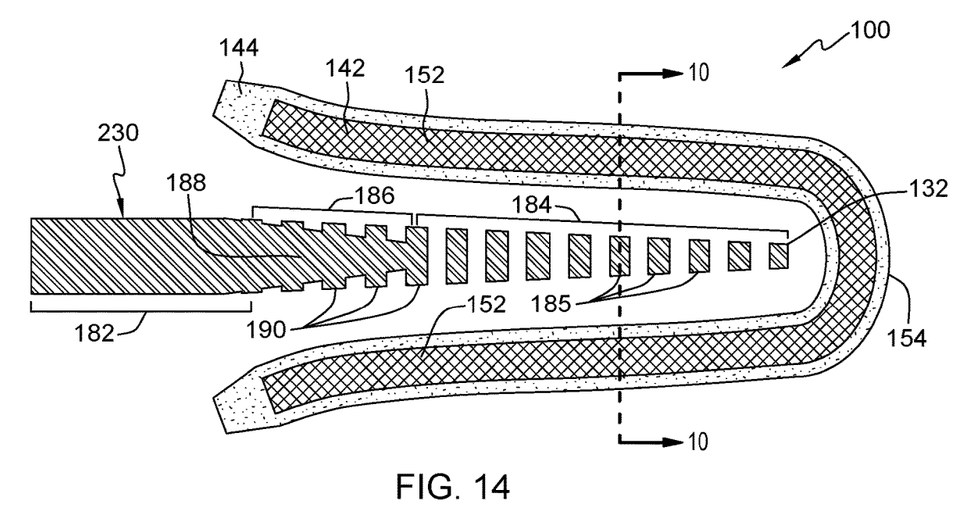
FIG. 14 shows a top-down view of a PIC including an optical absorber, according to additional embodiments of the disclosure.
Figure 15:
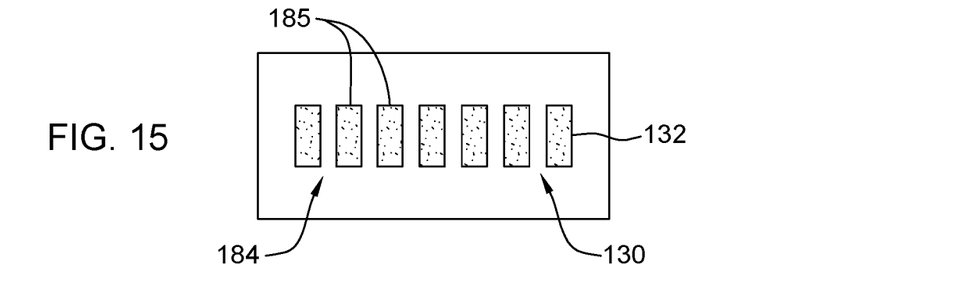
FIG. 15 shows a top-down view of a waveguide, according to other embodiments of the disclosure.
Figure 16:
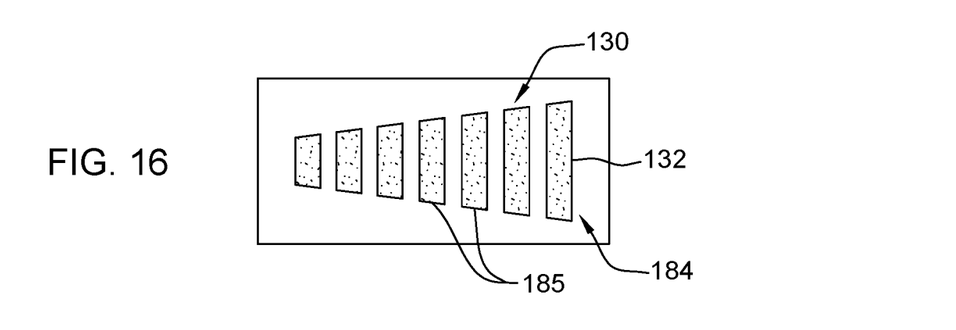
FIG. 16 shows a top-down view of a waveguide, according to other embodiments of the disclosure.
Figure 17:
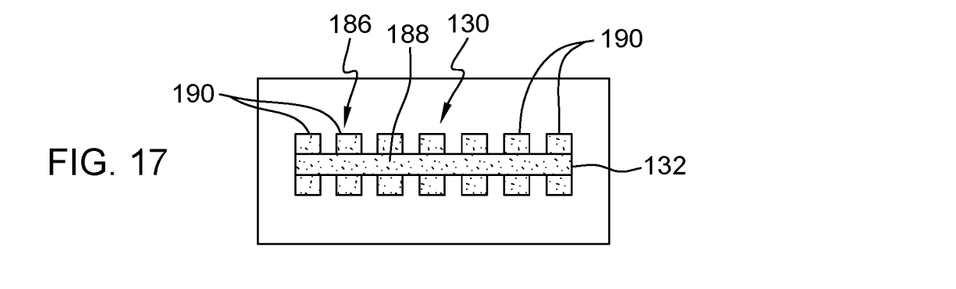
FIG. 17 shows a top-down view of a waveguide, according to other embodiments of the disclosure.
Figure 18:
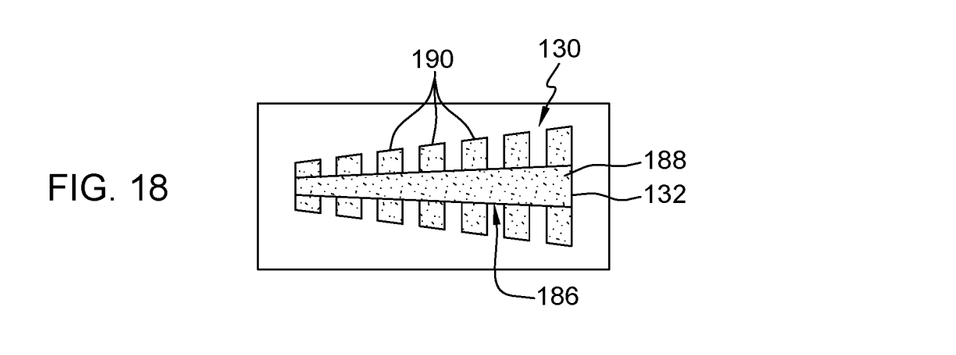
FIG. 18 shows a top-down view of a waveguide, according to other embodiments of the disclosure.
Figure 19:
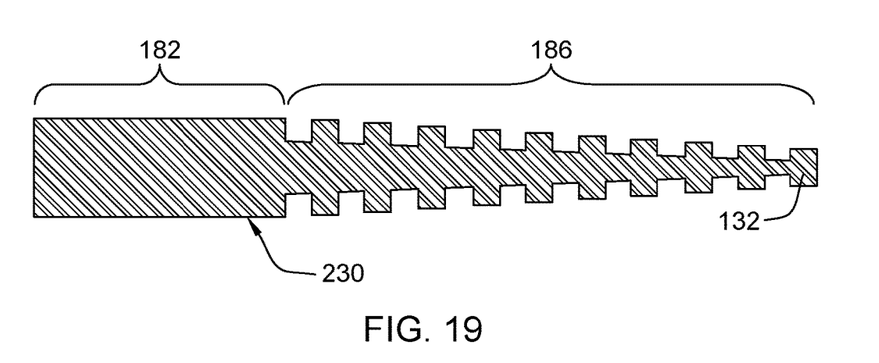
FIG. 19 shows a top-down view of a waveguide, according to other embodiments of the disclosure.

Waveguide 130 may be solid along its length (horizontal on page), which may be referred to as a solid peg layout. Alternatively, as shown in the top-down views of FIGS. 13-18, a sectioned waveguide 230 may include at least one section that is segmented in some way. FIGS. 13 and 14 show top-down views of sectioned waveguides 230 with a respective optical absorber 140, and FIGS. 15-18 show just sectioned waveguides 230. FIGS. 13 and 14 show a combination peg and segmented fishbone layout. In these embodiments, sectioned waveguide 230 includes a solid portion 182 (i.e., solid peg, perhaps but not necessarily tapered), a segmented portion 184 (i.e., with individually spaced segments 185 with a dielectric of interconnect layers 118 therebetween), and a fishbone portion 186. Fishbone portion 186 includes a smaller solid peg with ribs that resembles a fishbone. More particularly, fishbone portion 186 can include a spine 188 (not as wide as solid portion 182) and ribs 190 extending from spine 188. Any number of ribs 190 may be used. FIGS. 15 and 16 show sectioned waveguide 230 with just a segmented portion 184, and FIGS. 17 and 18 show waveguide 130 with just a fishbone portion 186. Portions 184, 186 can taper in width (vertical on page) in any manner desired. For example, FIG. 15 shows segmented portion 184 with segments 185 of equal width (vertical on page), and FIG. 16 shows segmented portion 184 with segments 185 of that are gradually wider (vertical on page) closer to terminal end 132. FIG. 17 shows fishbone segment 186 with ribs 190 of equal length, and FIG. 18 shows fishbone portion 186 with ribs 190 of that are gradually wider (vertical on page) closer to terminal end 132. FIG. 19 shows a sectioned waveguide 230 with a solid portion 182 and a fishbone portion 186, but no segmented portion 184 (FIGS. 13-16).

Variations of optical absorber 140 will now be described. While waveguide 130, 230 and optical absorber 140 have been shown near active SOI layer 112, waveguide 130, 230 and optical absorber can be in any MOL or BEOL interconnect layer 118. FIG. 20 shows a cross-sectional view of an illustrative waveguide 130 (could be any form described herein) and optical absorber 140 in a BEOL dielectric layer 150. In this example, waveguide 130 includes silicon nitride, and optical absorber 140 includes just light absorbing layer 142. Where light absorbing layer 142 is in BEOL dielectric layer 150 of interconnect layers 118, i.e., not immediately above active SOI layer 112, it may include a polycrystalline germanium. Any number of vertically spaced light absorbing layers 142 are possible in this setting.

Figure 21:
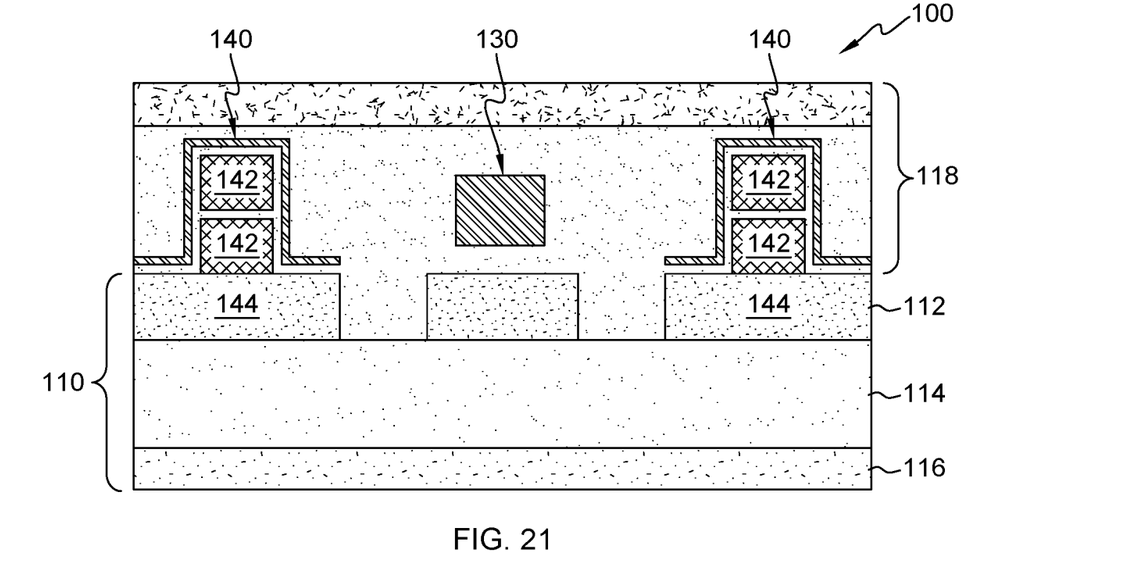
FIG. 21 shows a cross-sectional view of a PIC including an optical absorber, according to other embodiments of the disclosure.
Figure 22:
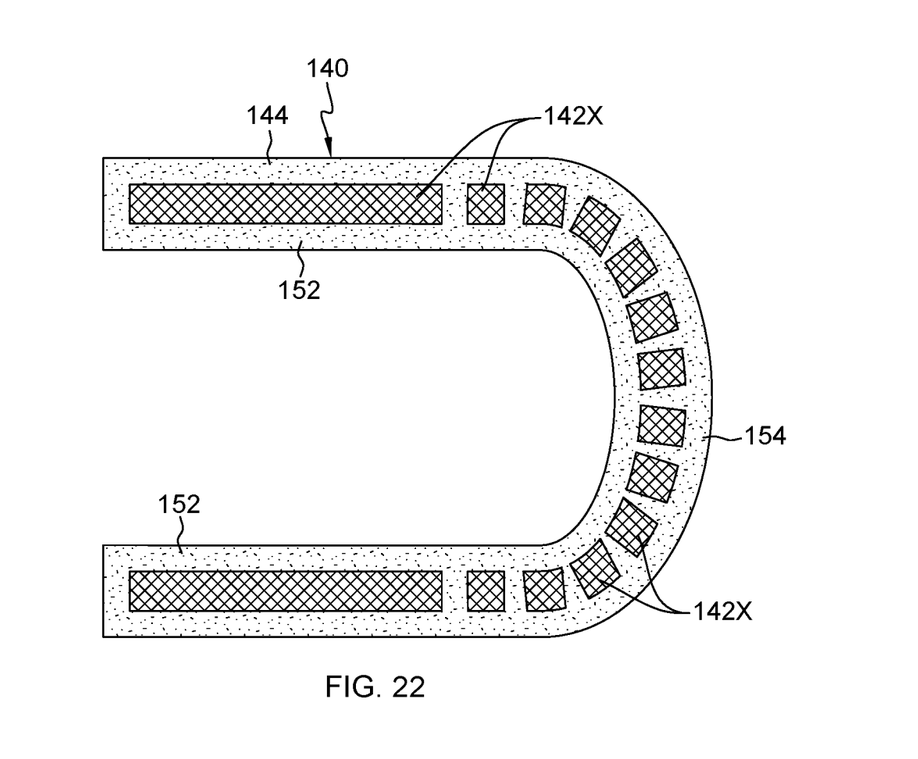
FIG. 22 shows a top-down view of an optical absorber, according to other embodiments of the disclosure.

While optical absorber 140 has been shown to include a single light absorbing layer 142, in certain embodiments, light absorbing layer 142 can be arranged in a large variety of vertically and/or horizontally segmented arrangements. In one example, as shown in FIG. 21, a plurality of light absorbing layers 142 may be used over silicon layer 144 in optical waveguide 140. That is, optical absorber 140 may include a plurality of vertically spaced or segmented light absorbing layers 142 (germanium-including or a vanadate-including layer), e.g., with an interlayer dielectric of interconnect layers 118 therebetween. Light absorbing layer 142 of optical absorber 140 may also be segmented in a horizontal arrangement along a length of optical absorber 140. FIG. 22 shows a top-down view of optical absorber 140 illustrated just one example of how light absorbing layer 142 may be segmented along a length of optical absorber 140, e.g., with an interlayer dielectric of interconnect layers 118 therebetween. As will be recognized, light absorbing layer 142 can be arranged in a large variety of alternative vertically and/or horizontally segmented arrangements to absorb any desired stray optical signals.

Figure 23:
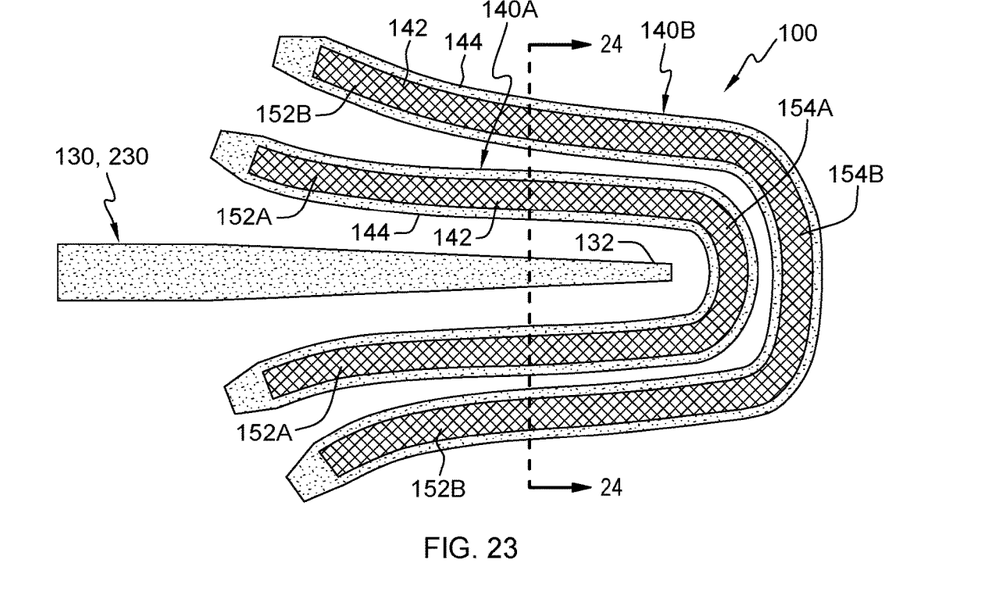
FIG. 23 shows a top-down view of a PIC including an optical absorber, according to embodiments of the disclosure.
Figure 24:
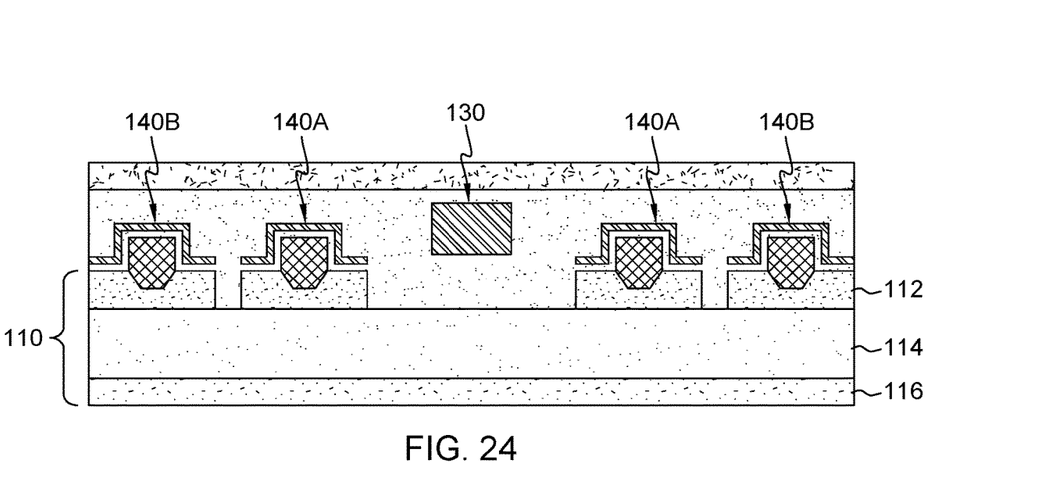
FIG. 24 shows a cross-sectional view of the PIC including the optical absorber along view line 24-24 in FIG. 23, according to embodiments of the disclosure.

FIG. 23 shows a top-down view and FIG. 24 shows a cross-sectional view along view line 24-24 in FIG. 23 of PIC 100, according to another embodiment. In FIGS. 1-22, only a single optical absorber 140 is provided. In other embodiments, optical absorber 140 may include a pair of nested optical absorbers 140A, 140B. Each optical absorber 140A, 140B has the curved shape surrounding terminal end 132 of waveguide 130, 230. Optical absorber 140B may have a larger bight portion 154B, e.g., longer between legs 152B, to accommodate bight portion 154A of optical absorber 140A therein. Each optical absorber 140A, 140B is shown including light absorbing layer 142 (of a germanium-including or a vanadate-including material) over silicon layer 144. However, optical absorbers 140A, 140B can take any form described herein. While a pair of optical absorbers 140A, 140B are illustrated, more than two optical absorbers may be nested in a similar manner to that shown.

Figure 25:
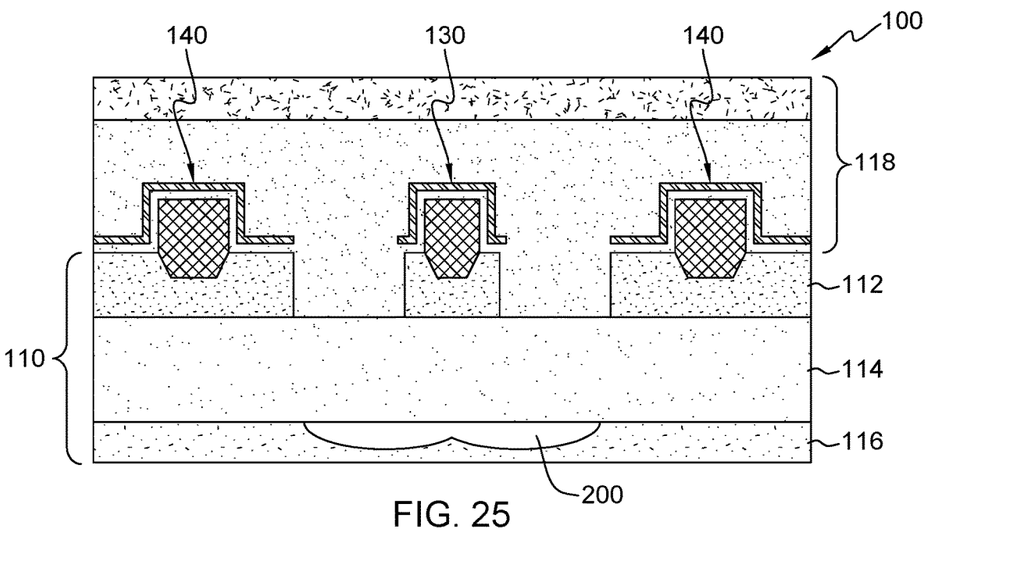
FIG. 25 shows a cross-sectional view of a PIC including an optical absorber, according to other embodiments of the disclosure.
Figure 26:
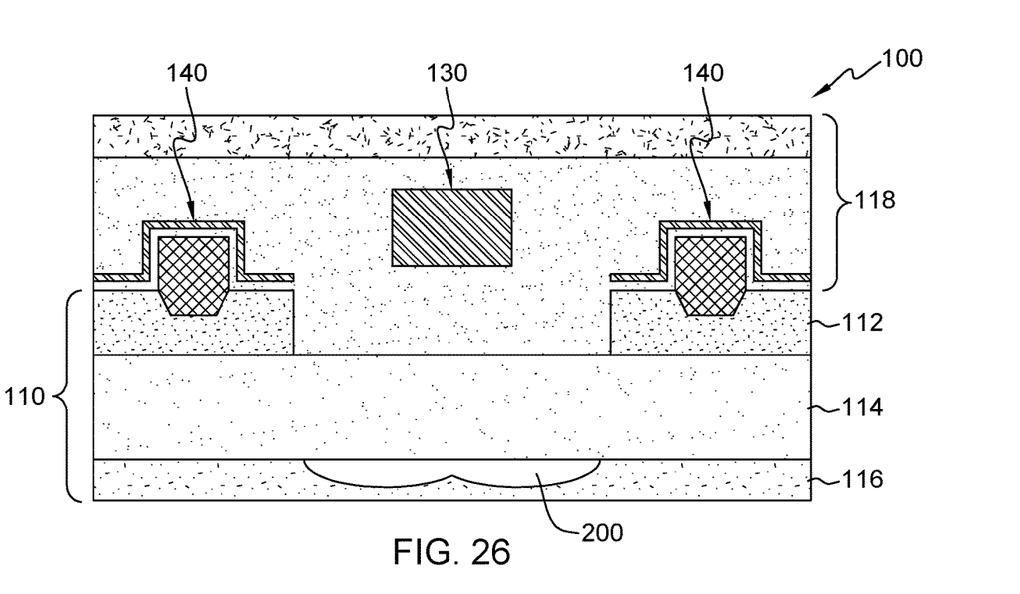
FIG. 26 shows a cross-sectional view of a PIC including an optical absorber, according to additional embodiments of the disclosure.

FIGS. 25 and 26 show cross-sectional views PIC 100 according to alternative embodiments. Notably, PIC 100 may further include an undercut or void 200 in base semiconductor layer 116 under waveguide 130, i.e., under buried insulator layer 114. Undercut 200 may further prevent stray optical signals from traveling into base semiconductor layer 116 from waveguide 130. Undercut 200 may be located under at least a portion of waveguide 130, e.g., under terminal end 132. While shown used with just two embodiments, undercut 200 can be used in any embodiment described herein.

With reference to FIGS. 1, 2 and 4, in an alternative embodiment, PIC 100 may include waveguide 130 in or over semiconductor substrate 110. Waveguide 130 includes first portion 134 of one of silicon (see e.g., FIG. 2) and silicon nitride (see e.g., FIG. 4) and second portion 136 of germanium positioned at least over first portion 134 (FIGS. 2 and 4) or under first portion 134 (dashed version in FIG. 4). As shown in, for example, FIG. 1, waveguide 130 is linear and has terminal end 132. As shown in FIG. 1, in certain embodiments, first portion 134 of waveguide 130 has a tapering width (vertical on page) along a length thereof with terminal end 132 having the smallest width of first portion 134, and second portion 136 of waveguide 130 has an enlarging width (vertical on page) along a length thereof with terminal end 132 having the largest width of second portion 136.

Optical absorber 140 has a curved shape surrounding terminal end 132 of waveguide 130 and includes a light absorbing layer 142 over silicon layer 144. A germanium-including light absorbing layer 142 of optical absorber 140 may include crystalline germanium (see e.g., FIG. 2), polycrystalline germanium (see e.g., FIG. 20) or amorphous germanium (FIG. 2 or 20). A vanadate-including light absorbing layer 142 may include a vanadate-based material (i.e., including vanadium and oxygen) such as but not limited to: calcium vanadate ($CaVO_3$) or strontium vanadate ($SrVO_3$). Optical absorber 140 has a U-shape having pair of legs 152 extending from bight portion 154. Terminal end 132 of waveguide 130 is aimed into bight portion 154, and pair of legs 152 may flare outwardly away from waveguide 130 near respective ends of legs 152. As shown in FIGS. 23 and 24, optical absorber 140 may include a pair of nested optical absorbers 140A, 140B. Each optical absorber 140A, 140B has the curved shape surrounding terminal end 132 of waveguide 130, 230. Each optical absorber 140A, 140B is includes light absorbing layer 142 (germanium-including or a vanadate-including layer) over silicon layer 144.

In the above-described embodiments, for stray optical signals to pass from the waveguide to the optical absorber and then be absorbed or attenuated by the light absorbing layer of the optical absorber, adjacent portions of the terminal end of the waveguide and the optical absorber must be sufficiently close and mode matching must occur at location(s) along the adjacent portions (i.e., there must be at least one location where the propagation constant of optical mode inside the two adjacent portions is the same). Those skilled in the art will recognize that the optical mode of light is generally determined by refractive index profile of the waveguide core and its cross-sectional geometric size and shape. If waveguide cores have the same refractive index profiles, mode matching generally occurs at a location where the cross-sectional areas of the adjacent portions of the waveguide cores are approximately the same. If waveguide cores are made of different core materials with different refractive index profiles, mode matching can occur at a location where adjacent portions of waveguide cores have different cross-sectional areas but the same propagation constant which is determined by the respective combinations of refractive index and cross-sectional area. When the sizes and/or the materials of the waveguide cores are different, these differences must be accounted for in order to achieve mode matching. Tapering of the terminal end of the waveguide and/or tapering of the legs of the light absorber can be employed to increase the likelihood that mode matching will occur between adjacent portions of the terminal end of the waveguide and of the light absorber that are made of different materials and/or sizes and/or in the presences of process variations.

A method of forming PIC 100 may include forming waveguide 130, 230 in or over semiconductor substrate 110. As noted, waveguide 130, 230 has terminal end 132. The method may also include forming optical absorber 140 having a curved shape surrounding terminal end 132 of waveguide 130, 230. Optical absorber 140 includes light absorbing layer 142 (germanium-including or a vanadate-including layer) over silicon layer 144. Waveguide 130, 230 and optical absorber(s) 140 can be formed using any now known or later developed semiconductor fabrication techniques.

It is emphasized that while each drawing shows certain aspects of waveguide 130, 230 and optical waveguide(s) 140, the various features of each part can be used together in any combination, including those not expressly illustrated.

Embodiments of the disclosure provide various technical and commercial advantages, examples of which are discussed herein. The optical absorber reduces optical noise and provides performance improvements for functional components and circuits (e.g., dark current reduction, scattering loss reduction). The optical absorber is fully compatible with current semiconductor process flows and does not require additional layers and/or process steps. The optical absorber can be placed in any area where stray optical signals (light scattering) are anticipated from a terminal end of a waveguide, such as but not limited to near sensitive photonic components such as photodetectors and/or optical modulators.

The structure and method as described above are used in the fabrication of integrated circuit and photonic integrated circuit chips. The resulting chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A photonic integrated circuit (PIC), comprising:
   a waveguide in or over a semiconductor substrate, the waveguide having a terminal end; and
   an optical absorber having a curved shape adjacent to opposing sides and an endwall of the terminal end of the waveguide, the optical absorber is multi-layered and includes a light absorbing layer,
wherein the optical absorber has a U-shape having a pair of legs extending from a bight portion, and the terminal end of the waveguide is aimed into the bight portion.

2. The PIC of claim 1, wherein the optical absorber includes the light absorbing layer over a silicon layer and the light absorbing layer includes one of germanium and a vanadate.

3. The PIC of claim 2, wherein the germanium of the optical absorber includes one of crystalline germanium, polycrystalline germanium and amorphous germanium, or the vanadate of the optical absorber includes one of calcium vanadate and strontium vanadate.

4. The PIC of claim 1, wherein the light absorbing layer is segmented along a length of the optical absorber.

5. The PIC of claim 1, wherein the pair of legs flare outwardly away from the waveguide near respective ends thereof.

6. The PIC of claim 1, wherein the optical absorber includes a pair of nested optical absorbers, each optical absorber having the curved shape surrounding the terminal end of the waveguide, each optical absorber includes the light absorbing layer over a silicon layer.

7. The PIC of claim 1, wherein the waveguide has a tapering width along a length thereof, the terminal end having a smallest width.

8. The PIC of claim 7, wherein the waveguide has a layout chosen from a group comprising: a solid peg layout, a segmented fishbone layout and a combination peg and segmented fishbone layout.

9. The PIC of claim 1, wherein the waveguide has a sinusoidal path along a portion of a length thereof.

10. The PIC of claim 1, wherein the semiconductor substrate includes a semiconductor-on-insulator (SOI) substrate including a semiconductor layer over a buried insulator layer over a base semiconductor layer, and further comprising an undercut in the base semiconductor layer under the waveguide.

11. The PIC of claim 1, wherein the semiconductor substrate includes a semiconductor-on-insulator (SOI) substrate including a semiconductor layer over a buried insulator layer over a base semiconductor layer, and wherein the waveguide includes one of: silicon in a semiconductor layer; silicon nitride over silicon in the semiconductor layer; silicon nitride above the semiconductor layer; amorphous silicon in the semiconductor layer; polysilicon above the semiconductor layer; and polysilicon over silicon in the semiconductor layer.

12. The PIC of claim 1, wherein the waveguide includes a first portion of one of silicon and silicon nitride and a second portion of the light absorbing layer positioned at least over the first portion or under the first portion.

13. The PIC of claim 12, wherein the silicon of the waveguide has a tapering width along a length thereof with the terminal end having a smallest width of the silicon, and the light absorbing layer of the waveguide has an enlarging width along a length thereof with the terminal end having a largest width of the light absorbing layer.

14. A photonic integrated circuit (PIC), comprising:
a waveguide in or over a semiconductor substrate, the waveguide including a first portion of one of silicon and silicon nitride and a second portion of germanium positioned at least over the first portion or under the first portion, and wherein the waveguide is linear and has a terminal end; and
an optical absorber having a curved shape surrounding the terminal end of the waveguide, the optical absorber includes a light absorbing layer over a silicon layer, wherein the light absorbing layer includes one of germanium and a vanadate.

15. The PIC of claim 14, wherein the first portion of the waveguide has a tapering width along a length thereof with the terminal end having a smallest width of the first portion, and the second portion of the waveguide has an enlarging width along a length thereof with the terminal end having a largest width of the second portion.

16. The PIC of claim 14, wherein the germanium of the optical absorber includes one of crystalline germanium, polycrystalline germanium and amorphous germanium, or the vanadate of the optical absorber includes one of calcium vanadate and strontium vanadate.

17. The PIC of claim 14, wherein the optical absorber has a U-shape having a pair of legs extending from a bight portion, wherein the terminal end of the waveguide is aimed into the bight portion, and wherein the pair of legs flare outwardly away from the waveguide near respective ends thereof.

18. The PIC of claim 14, wherein the optical absorber includes a pair of nested optical absorbers, each optical absorber having the curved shape surrounding the terminal end of the waveguide, each optical absorber includes the light absorbing layer over the silicon layer.

19. A method of forming a photonic integrated circuit (PIC), the method comprising:
forming a waveguide in or over a semiconductor substrate, wherein the waveguide is linear and has a terminal end; and
forming an optical absorber having a curved shape surrounding the terminal end of the waveguide, the optical absorber includes a light absorbing layer over a silicon layer, wherein the light absorbing layer includes one of germanium and a vanadate.

20. The method of claim 19, wherein the waveguide has a layout chosen from a group comprising: a solid peg layout, a segmented fishbone layout and a combination peg and segmented fishbone layout.

* * * * *